United States Patent Office 3,104,619
Patented Sept. 24, 1963

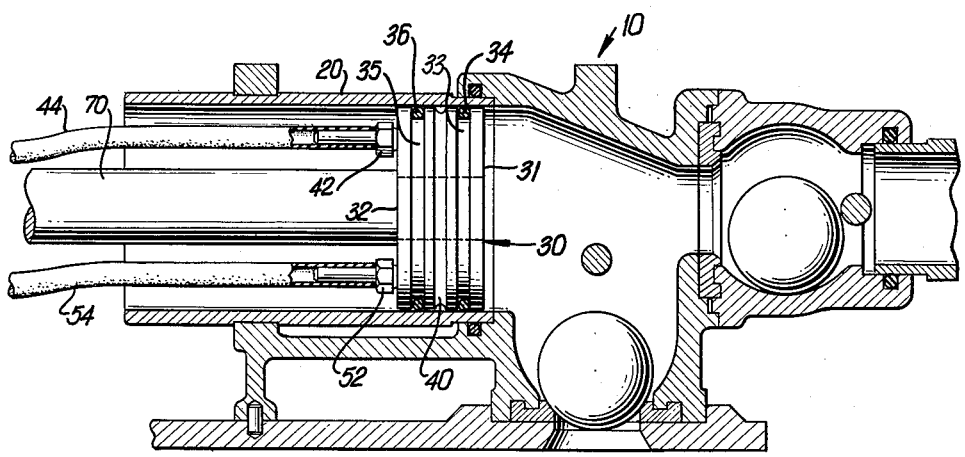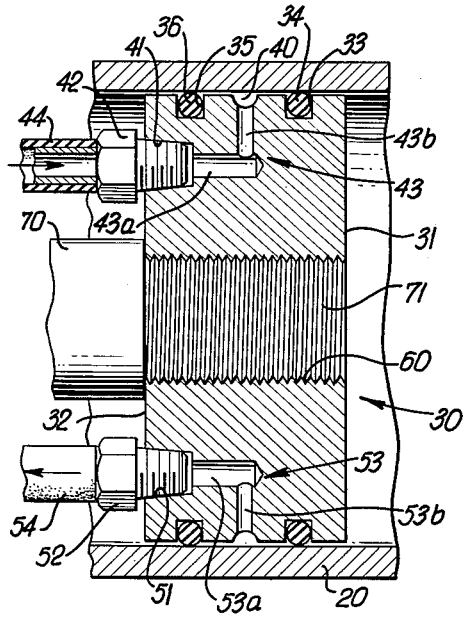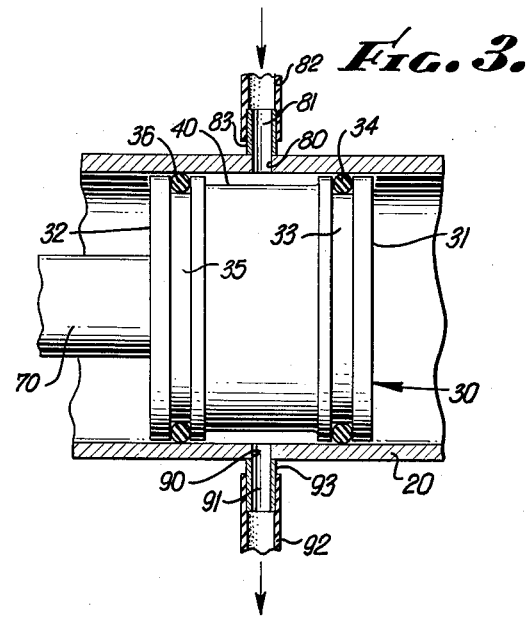

3,104,619
PISTON HEAD
Rassele Edwards Swarthout, Downey, Calif., assignor to Challenge-Cook Bros., Incorporated, Los Angeles, Calif., a corporation of California
Filed Dec. 27, 1960, Ser. No. 78,703
1 Claim. (Cl. 103—204)

This invention relates to a piston head which is particularly adaptable for use in a pump for pumping slurry materials having high abrasive qualities, such as plaster. The cylinder and piston head in such a pump are normally subject to severe wear and tear from the abrasive material being pumped, and when a conventional piston head is used, the piston head, and often the cylinder itself, must be frequently replaced, at a substantial cost and loss of operating time.

It is an object of the present invention to provide a piston head for such a pump which is constantly lubricated by fluid under pressure, preferably water, to overcome the abrasive action of the slurry material and to aid in the effective pumping of said material.

It is another object of the invention to provide a piston head for such a pump which will have a long, effective operating life.

It is still another object of the invention to provide a piston head for such a pump which is simple and inexpensive to manufacture, and easy to install and operate.

Other and more specific objects and advantages will appear and be brought out more fully in the following specification considered with reference to the accompanying drawing throughout which like parts are designated by like numerals.

In the drawings:

FIGURE 1 is a side elevational view, partly in section, showing a plaster pump with the piston head of the present invention installed in the cylinder of said pump.

FIGURE 2 is an enlarged vertical cross-sectional view of the piston head.

FIGURE 3 is a side elevational view, partly in section, of a pump cylinder with an alternative form of the piston head installed therein.

A plaster pump 10 has a hollow pump cylinder 20 mounted thereon and operatively connected thereto.

Slidably disposed in said cylinder 20 is a cylindrical piston head body 30 having a forward head end 31 and a rearward end 32.

A first annular groove 33 is formed in the peripheral surface of said piston head 30, adjacent to but spaced apart from said head end 31 and disposed in said first groove 33 is an annular gasket 34. A second annular groove 35 is formed in said peripheral surface, adjacent to but spaced apart from said rearward end 32, and spaced apart from said first groove 33. Disposed in said second groove 35 is an annular gasket 36.

A third annular groove 40 is formed in said peripheral surface intermediate said first groove 33 and said second groove 35, and said third groove 40 is spaced apart from said grooves 33 and 35.

A first threaded bore 41 is formed in the rearward end 32 of piston head 30. A hose coupling 42 is disposed in said bore 41. A fluid passageway 43 is formed in said piston head 30 so as to provide fluid passage from said hose coupling 42 to said third groove 40.

Said fluid passageway 43, for purposes of convenience in construction, may be comprised of one passage section 43a, disposed in axial alignment with said hose coupling 42 and providing fluid access from said hose coupling 42, and a second passage section 43b, disposed at right angle to said first passage section 43a and providing fluid access from said passage section 43a to said third groove 40. A flexible hose 44 is connected at one end thereof to said hose coupling 42. The other end of said hose 44 is operatively connected to a suitable source of fluid under pressure, such as a water tap (not shown).

A second threaded bore 51 is formed in the rearward end 32 of piston head 30, and spaced apart from said first bore 41. A hose coupling 52 is disposed in said bore 51. A fluid passageway 53 is formed in said piston head 30 so as to provide fluid passage from said third groove 40 to said hose coupling 52. As in the case of fluid passageway 43, fluid passageway 53, for purposes of convenience in construction, may be comprised of one passage section 53a, disposed in axial alignment with said hose coupling 52 and providing fluid access to said hose coupling 52, and a second passage section 53b, disposed at right angle to said first passage section 53a and providing fluid access from said third groove 40 to said first passage section 53a. A flexible hose 54 is connected at one end thereof to said hose coupling 52. The other end of said hose 54 (not shown) is arranged to discharge fluid under pressure.

A threaded bore 60 is formed axially in said piston head 30. A piston rod 70 has a threaded end 71 disposed in said bore 60, and said piston rod 70 extends from the rearward end 32 of piston head 30 to any suitable source of reciprocal power (not shown).

In the preferred form of the device illustrated in FIGURES 1 and 2 of the drawings, the third groove 40 is relatively narrow, and the fluid inlet and outlet lines affiliated with said third groove 40 are disposed in the rearward end 32 of piston head 30. In the alternative form of the device illustrated in FIGURE 3 of the drawings, the piston head 30 is substantially deeper, the space between first groove 33 and second groove 35 is substantially wider, and third groove 40 is also substantially wider, than corresponding parts of piston head 30 in the preferred form of the device.

Furthermore, in the alternative form of the device there are no bores 41 and 51 in the rearward end 32 of piston head 30, and consequently no fluid inlet and outlet connections at said rearward end 32, nor are there internal fluid passageways 43 and 53 leading to and from third groove 40. In lieu of said bores 41 and 51 and said passageways 43 and 53, in the alternative form of the device a first port 80 is formed in the peripheral surface of cylinder 60 and disposed so as too be open internally to groove 40 and to provide fluid access to said groove 40 at all times, regardless of the reciprocal movement of piston head 30 in cylinder 20. An externally protruding nipple 81 may be disposed in said port 80, and a fluid inlet conduit 82, which may be rigid or flexible, as desired, is mounted at one end thereof on said nipple 81. To obtain a leakproof connection between said nipple 80 and said conduit 82, a gasket or compressible collar 83 may be interposed between said nipple 81 and said conduit 82. The other end of said conduit 82 is operatively connected to a suitable source of fluid under pressure, such as a water tap (not shown).

A second port 90 is formed in the peripheral surface of cylinder 60, is spaced apart from said first port 80, and is disposed so as to be open internally to groove 40 and to provide fluid outlet from said groove 40 at all times, regardless of the reciprocal movement of piston head 30 in cylinder 20. An externally protruding nipple 91 may be disposed in said port 90, and a fluid outlet conduit 92, which may also be rigid or flexible, as desired, is mounted at one end thereof on said nipple 91. Again, a leakproof connection between nipple 91 and conduit 92 may be attained by interposing a gasket or compressible collar 93 between said nipple 91 and said conduit 92. The other end of said conduit 92 (not shown) is arranged to discharge fluid under pressure.

It has been found that the operation of a pump equipped with the device of the present invention, with piston head lubrication being provided by a continuous flow of fluid under pressure, not only offers greater resistance to the abrasive qualities of the slurry material being pumped, but also substantially increases the pumping potential of the piston head in the cylinder.

Furthermore, it has been found that when the device of the present invention is used with a plaster pump, water under pressure is a most satisfactory fluid for use in the device, and in such plaster pump use water under pressure is conducted by hose 44, hose coupling 42, and fluid passageway 43, to third groove 40 in the preferred form of the device (or by conduit 82, nipple 81, and port 80, to third groove 40 in the alternative form of the device). Water under pressure circulates in groove 40 and is discharged therefrom by means of passageway 53, hose connection 52, and hose 54, in the preferred form of the device (and by port 90, nipple 91 and conduit 92 in the alternative form of the device).

Excess leakage of fluid from said third groove 40 into the pump 10 around the head end 31 of piston 30 is prevented by gasket 34, so that the slurry material being pumped is not unduly diluted. Similarly, excess leakage into cylinder 20 is prevented by gasket 36. Because the water is under pressure, no substantial quantity of the slurry material will mix with the water, and consequently, the lubricating qualities of the water will not be lessened, and no substantial abrasion will occur in the cylinder walls of cylinder 20, or on the peripheral surface of piston head 30. Any slurry material that does find its way into groove 40 will be discharged through hose 54 (or through conduit 92 in the alternative form of the device), so that clear fluid circulatory lubrication is maintained in groove 40 throughout the entire reciprocal movement of piston head 30 in cylinder 20.

In both the preferred and the alternative forms of the device, means for circulating fluid under pressure in third groove 40 and for discharging said fluid therefrom are hereinabove described. However, if desired, said discharge means may be eliminated, so that fluid under pressure is introduced into and maintianed in said third groove 40, but not continuously circulated and discharged therefrom.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent structures and devices.

Having described my invention, and what I claim as new and desire to secure by Letters Patent is:

A pump cylinder assembly for pumping a slurry, which comprises: a hollow pump cylinder adapted to receive and transport a slurry of material soluble in a pressurized liquid deposited on the wall of said cylinder for the dual purpose of (1) flushing adhering slurry from the wall of said cylinder, and (2) providing a lubricant; a reciprocal piston disposed in said cylinder; said piston having a first and a second annular groove, each of which has a gasket therein employed for the dual purpose of (1) containing said liquid between said gaskets and away from said slurry of material to prevent dilution of said slurry, and (2) wiping adhering slurry dissolved in said liquid from the wall of said cylinder, said piston including a third annular groove located between said first and second grooves, said third groove having the dual purpose of (1) being employed as a canal to carry and deposit said liquid on said wall of said cylinder, and (2) carrying said liquid and slurry dissolved in said liquid away from said cylinder; a liquid inlet at one end of said piston in communication with said third groove for admitting liquid into said third groove; a flexible hose disposed in said cylinder, said hose having one end thereof mounted on said inlet, and having its other end connected to a source of liquid under pressure; a liquid outlet at the same end of said piston for carrying said liquid and slurry dissolved in said liquid from said third groove; and a second flexible hose disposed in said cylinder, said second hose having one end thereof mounted on said outlet, and having its other end disposed so as to discharge liquid from said outlet and cylinder.

References Cited in the file of this patent
UNITED STATES PATENTS

| | | |
|---|---|---|
| 129,631 | Waring | July 16, 1872 |
| 255,116 | Rand | Mar. 21, 1882 |
| 323,749 | Stitzel | Aug. 4, 1885 |
| 504,094 | Schmaltz | Aug. 29, 1893 |
| 648,153 | Serve | Apr. 24, 1900 |
| 694,078 | Ritchie | Feb. 25, 1902 |
| 1,529,589 | Hebrard | Mar. 10, 1925 |
| 1,597,161 | Kellogg et al. | Aug. 24, 1926 |
| 1,647,425 | Wise | Nov. 1, 1927 |
| 1,768,633 | Ries | July 1, 1930 |
| 1,774,967 | Ellis | Sept. 2, 1930 |
| 2,858,767 | Smith | Nov. 4, 1958 |